UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF MAKING NITRATES.

1,013,984. Specification of Letters Patent. Patented Jan. 9, 1912.

No Drawing. Application filed December 7, 1909. Serial No. 531,869.

*To all whom it may concern:*

Be it known that we, CARL BOSCH, Ph. D., and WILHELM WILD, Ph. D., chemists, subjects, respectively, of the King of Prussia and the Grand Duke of Baden, residing at Ludwigshafen-on-the-Rhine, Germany, have invented new and useful Improvements in Processes of Making Nitrates, of which the following is a specification.

Our invention relates to the production of nitrates.

We have discovered that if a solution containing a nitrite, either alone or mixed with a nitrate, be treated with a mixture of gases containing a higher oxid of nitrogen and oxygen, the nitrite can be converted into nitrate. Under the term higher oxid of nitrogen we include all the oxids of nitrogen except nitrous oxid ($N_2O$).

Our invention is of particular use for the treatment of mixtures of nitrite and nitrate such as are generally obtained when the nitrous gases produced by passing air through an electric discharge are caused to act on a base, either in a solid form or in a state of solution or suspension.

The process of our invention possesses certain advantages over the process for absorbing oxids of nitrogen with water with the production of nitric acid, since smaller apparatus can be employed and further the absorption of the nitrous gases proceeds more rapidly when a neutral or nearly neutral solution be employed, such as is the case in the present invention, than when the said nitrous gases are treated with a more or less concentrated nitric acid. The process should be so carried out that the gases come as thoroughly as possible into contact with a solution containing a nitrite, and for this purpose we prefer to make use of towers through which the gases are passed and down which the solution of nitrite is allowed to trickle.

The following example will serve to illustrate our invention, but we do not wish to be understood as in any way limiting the invention to the example given. Allow a solution containing sixteen and three-tenths per cent. of calcium nitrate and eighteen per cent. of calcium nitrite to trickle down an absorbing tower which is packed with suitable material and at the same time pass through the tower a current of gases containing two per cent. of nitrogen tetroxid, such gas being obtainable for instance by treating air with a suitable electric discharge. The gas entering the tower possesses a temperature of fifty-six degrees centrigrade and leaves at thirty degrees centigrade, while the solution possesses a temperature of from eighteen to twenty degrees centigrade on entering and of about from twenty-eight to thirty degrees centigrade on leaving. The oxidation of the nitrite may be complete after the solution has passed once through the tower or it may be necessary to pass the solution more than once through the tower, or through more than one tower, according to the quantity of solution used and the rate at which it as well as the gases flow. The completion of the oxidation can be ascertained by analysis and also by the solution, which was previously yellow, becoming colorless. It is then found to contain forty-six and a half per cent. of calcium nitrate and only seventeen hundredths per cent. of calcium nitrite, that is to say, both the oxidation of the nitrite and the evaporation of a part of the water have taken place at the same time. The solution containing calcium nitrate and calcium nitrite employed according to this example can be obtained, for instance, by absorbing dilute nitrous gases by means of milk of lime.

Now what we claim is:—

1. The process of producing nitrate by treating a solution containing a nitrite with an oxid of nitrogen and oxygen substantially as hereinbefore described.

2. The process of producing nitrate by treating a solution containing a nitrite and a nitrate with a gaseous mixture containing an oxid of nitrogen and oxygen substantially as hereinbefore described.

3. The process of producing practically pure calcium nitrate by treating a solution containing calcium nitrite and calcium nitrate with a gaseous mixture containing an oxid of nitrogen and oxygen substantially as hereinbefore described.

In testimony whereof we have hereunto set our hands in the presence of two subscribing witnesses.

CARL BOSCH.
WILHELM WILD.

Witnesses:
  J. ALEC LLOYD,
  W. W. SCHMIDT.